(No Model.) 3 Sheets—Sheet 1.

J. W. HYATT.
AERATION OF WATER IN RESERVOIRS.

No. 370,016. Patented Sept. 13, 1887.

Attest:
William R. Sands
Thos. S. Crane

Inventor:
John W. Hyatt

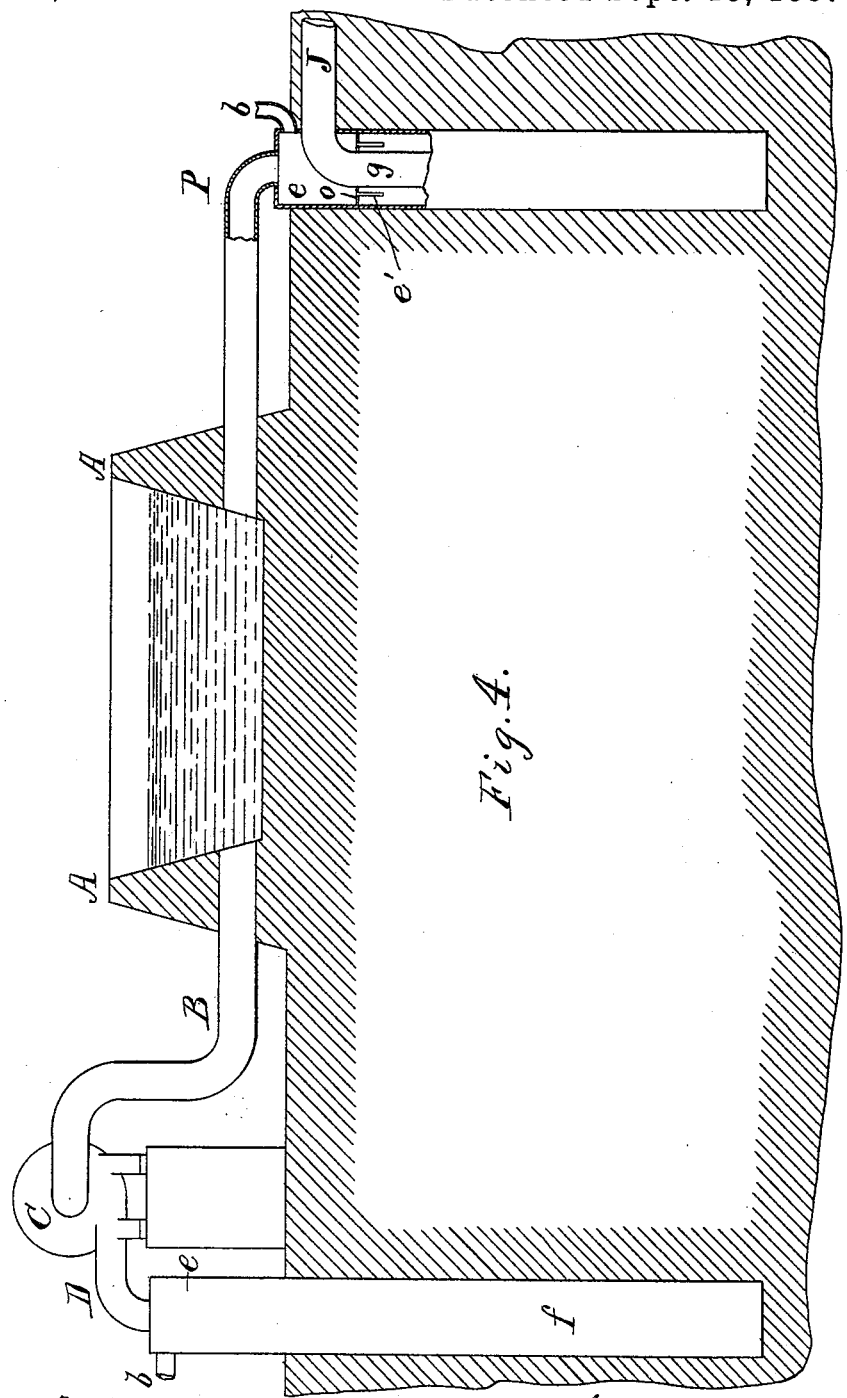

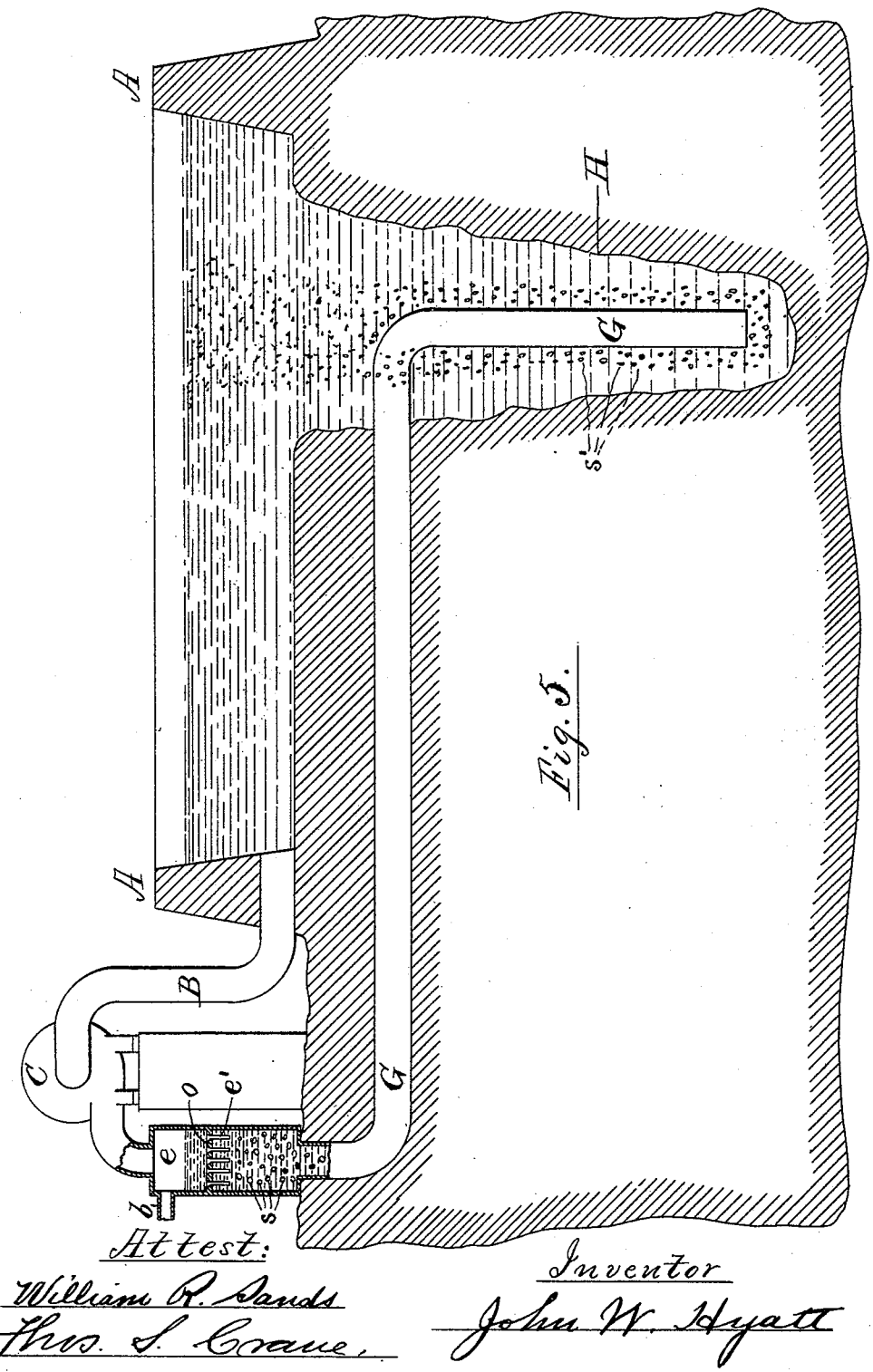

UNITED STATES PATENT OFFICE.

JOHN W. HYATT, OF NEWARK, NEW JERSEY, ASSIGNOR TO THE HYATT PURE WATER COMPANY, OF SAME PLACE.

AERATION OF WATER IN RESERVOIRS.

SPECIFICATION forming part of Letters Patent No. 370,016, dated September 13, 1887.

Application filed July 20, 1886. Serial No. 208,579. (No model.)

*To all whom it may concern:*

Be it known that I, JOHN W. HYATT, a citizen of the United States, residing at Newark, Essex county, New Jersey, have invented certain new and useful Improvements in Aeration of Water in Reservoirs, fully described and represented in the following specification and the accompanying drawings, forming a part of the same.

This invention relates to an improved process of and apparatus for purifying the water stored in reservoirs, and is adapted for application to the storage-reservoirs of cities and large water-supplies of any kind, whether such reservoir be formed in an artificial receptacle or in a natural pond or lake.

The object of the invention is to diminish the amount of oxidizable matter present in the water, and to otherwise effect such chemical changes as are known to result from the mingling of air intimately therewith, and in particular to render the water more healthful for drinking purposes by depriving it of such constituents as are adapted to support germ life. The removal of such constituents, notably albuminoid ammonia, tends to preserve the water sweet and healthful for an indefinite period of time and to prevent the development therein of bacteria or germs adapted to produce disease in those who drink the water.

To secure the removal of the water from every part of the reservoir, I preferably divide its area by a series of partitions into a tortuous channel, and by the movement of the water from and to the reservoir at opposite ends of such channel I induce a current which traverses every part of the reservoir and transports its entire contents by degrees to the outlet-pipe.

My invention also consists in the combination, with such an aerating process applied to a reservoir, of a process for subsequently aerating the water on its removal from the reservoir for introduction into the main distributing-pipes.

Figure 1:
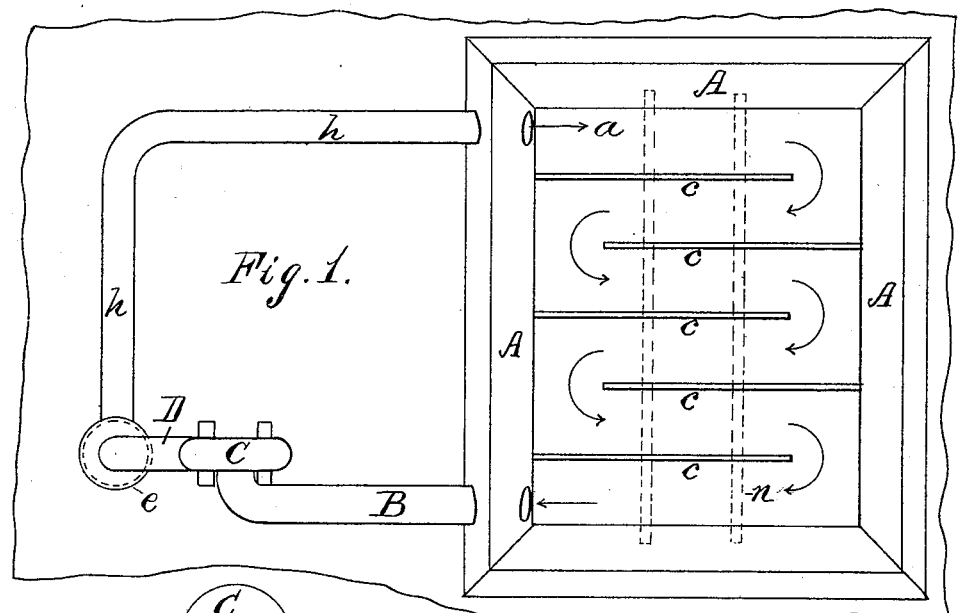
Figure 2:
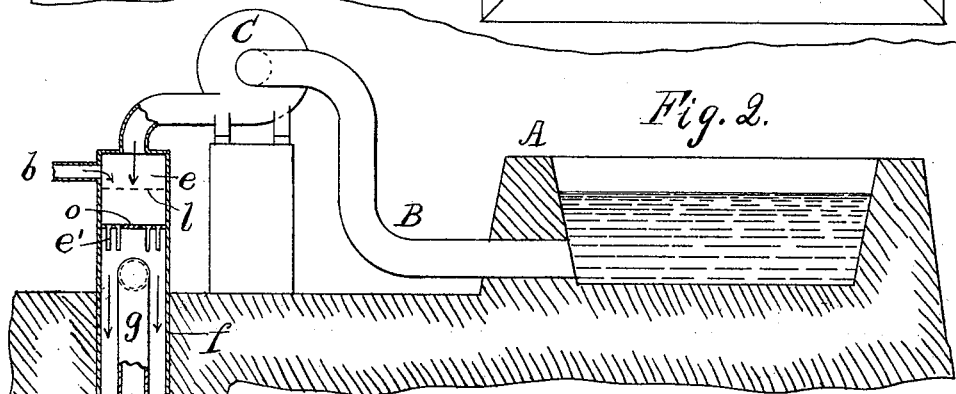
Figure 3:
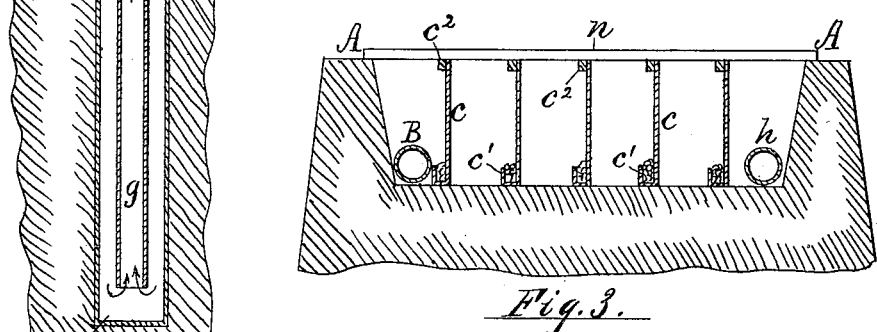

My improvements will be understood by reference to the annexed drawings, in which Figure 1 represents a plan of a reservoir provided with internal partitions and an external aerating apparatus. Fig. 2 is an elevation of the same in section where hatched. Fig. 3 is a longitudinal section of the reservoir on line $x$ $x$ in Fig. 1. Fig. 4 is a plan of the parts shown in Fig. 1, with the addition of an aerating device intermediate to the reservoir and the main distributing-pipe; and Fig. 5, an alternative construction.

A represents the walls of the reservoir; B, an outlet-pipe drawing the water therefrom, or from a channel formed therein, and connected with a centrifugal pump, C; and D is the discharge-pipe of the pump, connected to the top of an aerating apparatus substantially like that described in my United States Patent No. 322,104, issued July 14, 1885.

In this apparatus the water is discharged into an air-chamber, $e$, where it falls through a series of tubes or apertures, $e'$, formed in a diaphragm, $o$, at the bottom of the air-chamber, and adapted to draw in air with the water, from which chamber the water passes, mingled with the air, downward into a pressure-pipe, $f$. The head or pressure of water existing in the lower parts of this pipe serves to combine the air with the water most effectively, and the water then escapes by a discharge-pipe, $g$, to an inlet-pipe, $h$, which enters the reservoir at the opposite end of a channel, $a$, or any other point. This channel is formed therein by partitions $c$, which are projected at regular intervals across the reservoir from two opposite sides thereof and compel the water to pass through a tortuous course of nearly the same cross-section throughout. By this means the entire contents of the reservoir are effectively transported to the outlet-pipe B, and their subjection to the aerating device is thus insured.

$b$ is a pipe supplying air to the chamber $e$, and $l$ represents within such chamber a water-level high enough to restore the water by natural gravity to the level of the reservoir A and to overcome the resistance of the intermediate passages. To apply the partitions $c$ readily to the reservoir without disturbing the walls or bed of the same when artificially constructed, I construct the partitions of wood or other buoyant material, with attached weights at the bottom adapted to hold them in the desired position relative to one another.

$c'$ are boxes shown attached to the bottoms of the partitions in Fig. 3, and filled with stones or equivalent ballast to anchor them in the desired location.

$c^2$ represents head-pieces or caps affixed to the tops of the partitions to stiffen them, and transverse braces $n$, one of which is shown across the tops of the caps in Fig. 3, may be used to hold the partitions together, or to brace them into the walls of the reservoir. Two such braces are indicated by the dotted lines $n$ in Fig. 1.

In Fig. 5 is shown an alternative construction, whereby the necessity for constructing a well or deep pressure-pipe outside of the reservoir may be avoided. This plan is particularly applicable where the reservoir is deeper at one part than another or contains a natural depression, as H in Fig. 5, which may be deepened sufficiently to furnish the desired head. In such case the water may pass directly from the aerating-chamber $e$, mingled with air, into a conduit-pipe, G, and be conducted downward into the lower part of such pit or depression H within the reservoir. The air and water would be subjected to the desired pressure in its passage downward through the pipe G, and when discharged into the reservoir would gradually rise to the surface by reason of its levity. The water would in such case be drawn before aeration from a part of the reservoir remote from the pit H, and partitions, as $c$, could be arranged within the reservoir between the outlet-pipe B and the inlet-pipe G, so as to circulate the aerated water by degrees through every part of the reservoir, as before described with reference to Fig. 1.

The air-bubbles drawn into the water at the air-chamber are represented at $s$ in Fig. 5, and although they would become almost invisible by the pressure to which they are subjected when mingled with the water in the pipe G, they would naturally rise toward the surface at $s'$ in Fig. 5, or would be carried in any direction to which the current of aerated water was drawn by the arrangement of the partitions $c$. The partitions are not shown in Fig. 5.

It is obvious that the water in the reservoir may be only once aerated or may be repeatedly subjected to the aerating device. I have found, as might have been expected, that the entire effect of the aeration is continued for a considerable period of time if the aerated water be kept at rest. The water in the reservoir may therefore be treated to remove those qualities which sustain germ life by allowing it to stand in the reservoir for a given period after a single aeration and then renewing the operation. Such renewed aeration may be effected in the same manner, or may be practiced upon the water on its transit to the main distributing-pipe, J, (shown in Fig. 4. This figure contains all the elements present in Fig. 1, by which the water of the reservoir is gradually aerated, and includes, in addition thereto, an aerating apparatus interposed in the main pipe to furnish the water with a fresh supply of air as it enters the distributing-conduits.

As the water always descends to a lower level in the process of distribution, the aerating apparatus may be made entirely automatic, and the use of a pump to raise the water above the level of the reservoir, as in Fig. 1, may be wholly avoided. Such apparatus is represented at P in Fig. 4 of construction similar to that shown in Fig. 2, except that the discharge-pipe $g$ is carried up through the diaphragm $o$, which holds the air-tubes $e'$. The conduit from the reservoir enters the top of the air-chamber, which is shown in section in Fig. 4, in manner similar to the pipe D in Fig. 2, and the discharge-pipe $g$ is carried up through the diaphragm $o$ to raise the water as nearly as possible to the height of the reservoir without obstructing the air-pipe $b$.

By connecting a lifting-pump of small power with the outlet-pipe of the reservoir the water may be readily raised to such a level as to flow through a gravity aerating device and return to the reservoir by its own weight or pressure, and by such construction I am thus enabled to subject the water to aeration under pressure, by which means only it can be made to absorb a large volume of air without the use of any pumps of high power or any air-compressing apparatus or means for forcing the air under pressure into contact with the water. The use of such a gravity aerating device in combination with a reservoir also enables me to aerate the water and return it to the reservoir or to discharge it to the distributing-mains without any great loss of head or the use of powerful pumps for exerting pressure upon the water or upon the air to produce the desired mixture of the two.

I am aware of United States Patent No. 327,269, dated September 29, 1885, which shows an open spraying device for aerating water upon its introduction to a reservoir. This patent also refers to the use of compressed air, to be prepared by suitable means and injected under pressure into the closed pipes containing the water. I do not, therefore, make any specific claim herein to either of such methods or means for aerating water, although it is obvious that it is not material what means I use for aerating the water in practicing some parts of my invention. I also disclaim the invention set forth in the said United States Patent No. 327,269.

By the continuous performance of the process described herein the water in a reservoir or pond of any magnitude may be entirely aerated without the expense of conducting the air to different parts of the pond, and the entire contents of the reservoir may be more effectively and certainly reached than when the air is applied to the water at one or more points within the reservoir.

So far as the withdrawal of the water from one end of the reservoir, subjecting it to aeration under pressure, and returning it to the other end of the reservoir are concerned, it is obviously immaterial how the aerating device be constructed, as other means for aerating would be equivalent to that which I have shown for such a specific purpose. This is also true with reference to the drawing of the water to the reservoir, subjecting it to aeration, returning it to the reservoir, and finally aerating the water on its passage from the reservoir to the main distributing-pipe.

Having thus set forth the nature of my invention, it will be seen that the process and apparatus are inseparable from one another, and I therefore claim them both herein as follows:

1. The process for aerating the contents of a reservoir, which consists in drawing the water from one end of the reservoir or a channel contained therein, subjecting the water to aeration, and restoring it to the reservoir at the opposite end of the same or of such channel, substantially as herein set forth.

2. The process for aerating the water in a reservoir, which consists in gradually drawing the liquid from the reservoir, subjecting it to aeration, returning it to the reservoir, allowing the aerated water to stand in the reservoir for a fixed period, and then renewing the aeration in a similar manner, as and for the purpose set forth.

3. The process for aerating the water in a reservoir and in the main distributing-pipe therefrom, which consists in first drawing the water gradually from the reservoir, subjecting it to aeration, then returning the water to the reservoir, and finally aerating the water on its passage from the reservoir to the main distributing-pipe, as and for the purpose set forth.

4. In an apparatus for aerating the water in a reservoir, the combination, with the reservoir, of an outlet-pipe communicating with an air-chamber, $e$, a pressure-pipe, $f$, extending down from such air-chamber and communicating with the latter through a perforated diaphragm, $o$, as described, and a water-discharge pipe extending upward from the lower part of the pressure-pipe and conducting the water from the pressure-pipe mingled with the air, as and for the purpose set forth.

In testimony whereof I have hereunto set my hand in the presence of two subscribing witnesses.

JOHN W. HYATT.

Witnesses:
 THOS. S. CRANE,
 O. N. BALDWIN.